Oct. 6, 1953   H. B. RICH   2,654,406
MACHINE FOR ASSEMBLING LADDERS
Filed July 26, 1951   3 Sheets-Sheet 2
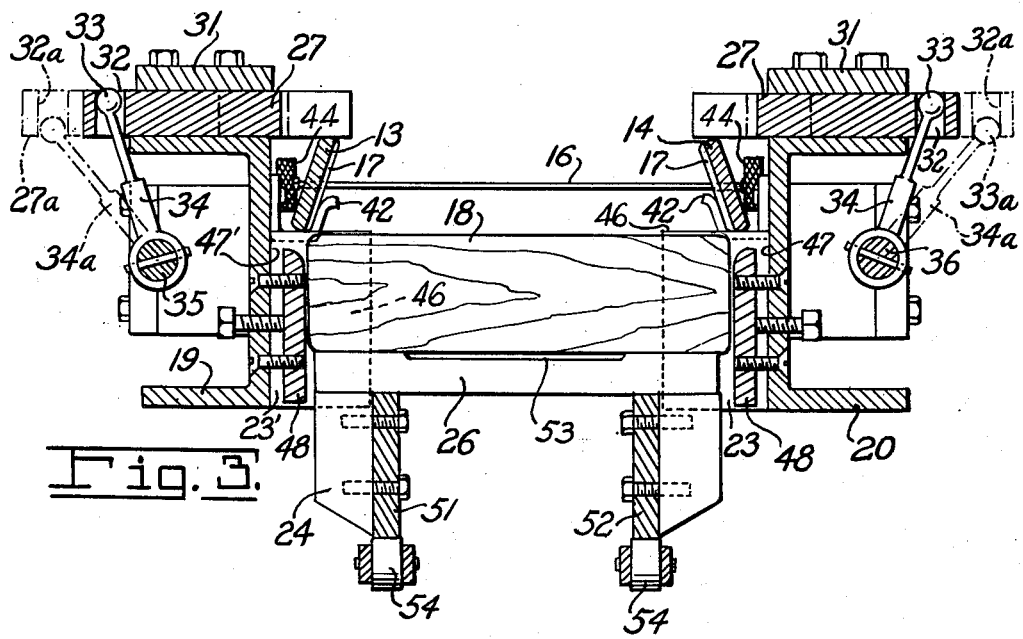
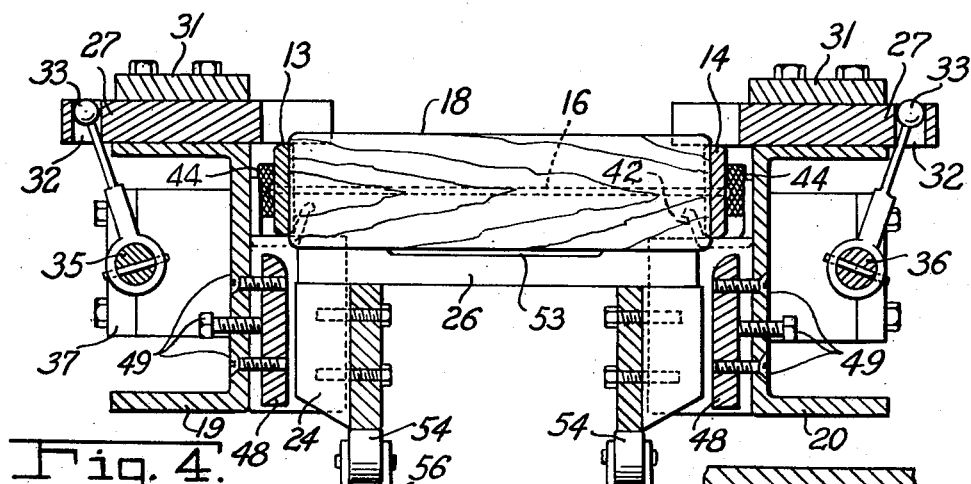
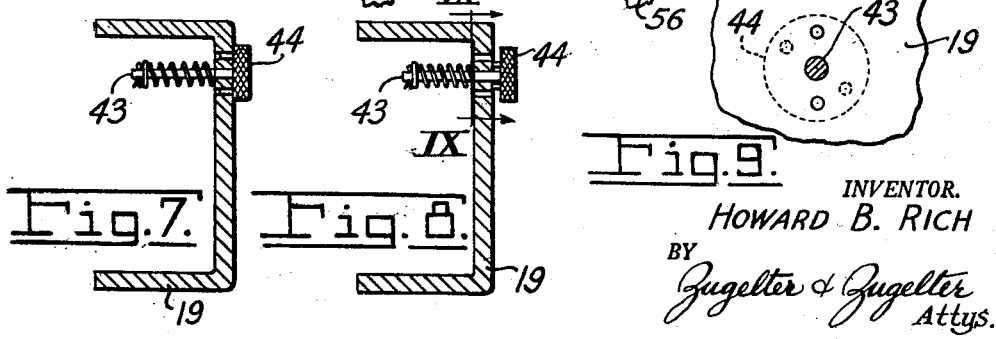
INVENTOR.
HOWARD B. RICH
BY
Zugelter & Zugelter
Attys.

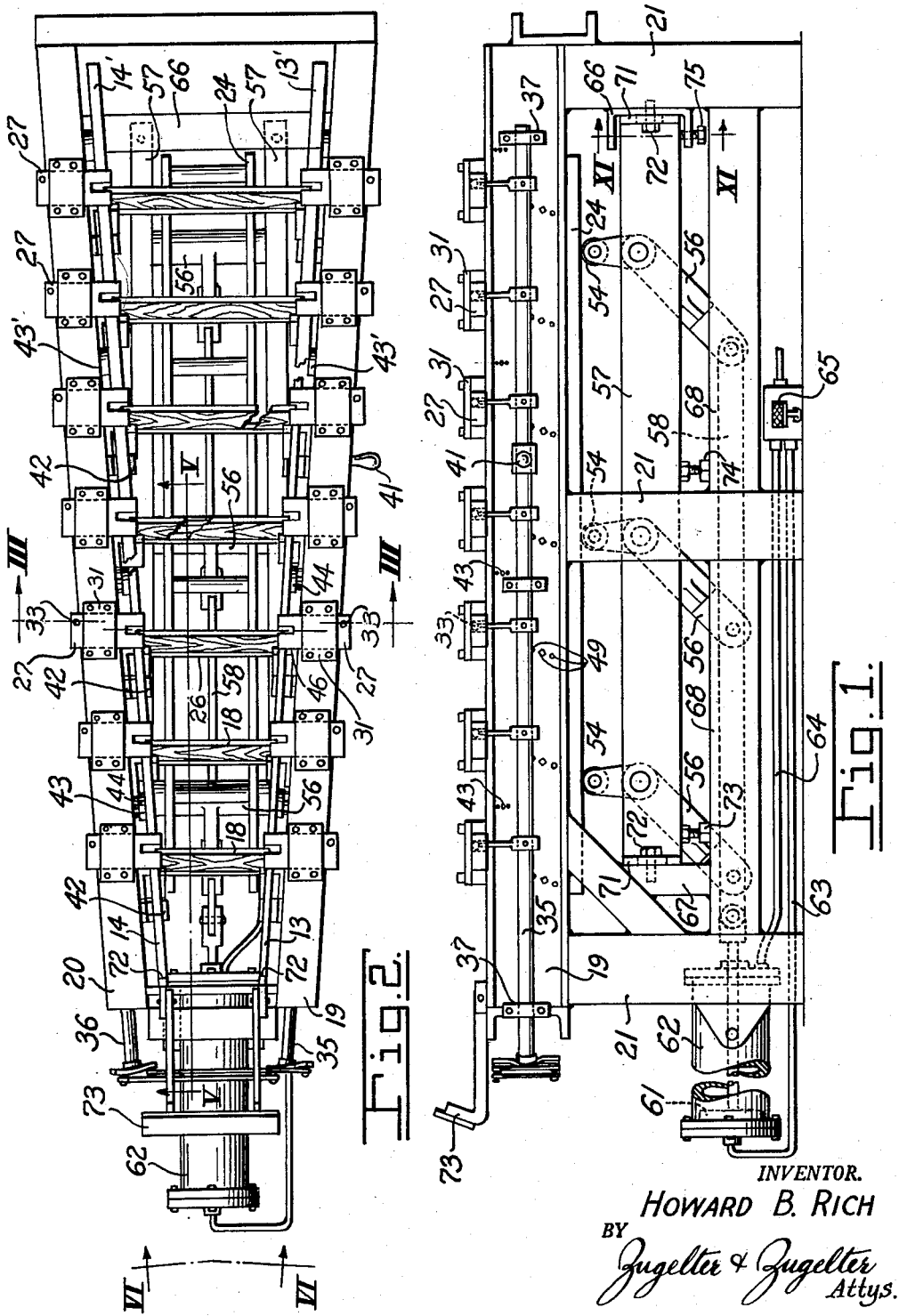

Oct. 6, 1953   H. B. RICH   2,654,406
MACHINE FOR ASSEMBLING LADDERS
Filed July 26, 1951   3 Sheets-Sheet 3
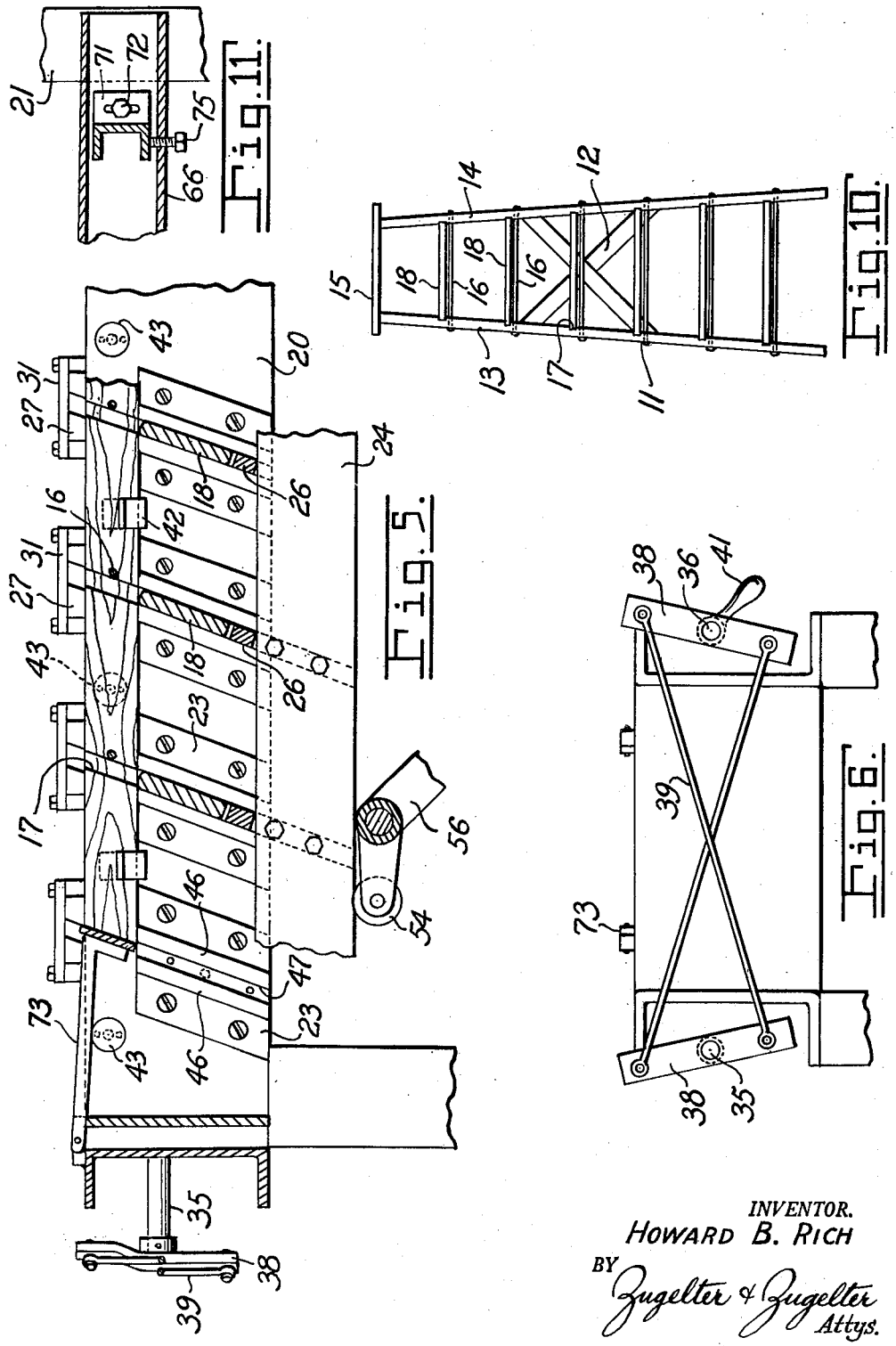
INVENTOR.
HOWARD B. RICH
BY
Zugelter & Zugelter
Attys.

Patented Oct. 6, 1953

2,654,406

UNITED STATES PATENT OFFICE 2,654,406

MACHINE FOR ASSEMBLING LADDERS

Howard B. Rich, Carrollton, Ky., assignor to Howard B. Rich, Inc., Carrollton, Ky., a corporation of Kentucky Application July 26, 1951, Serial No. 238,711

2 Claims. (Cl. 144—2)

1

This invention relates to a machine for driving step boards of a ladder into gains in side rails thereof. More particularly, this invention relates to a machine of the type shown generally in Uline Patent No. 1,842,850 and to improved side rail holding mechanism for a machine of this type.

An object of this invention is to provide a machine which engages and firmly holds the side rails of a ladder as step boards are driven into the gains thereof.

A further object of this invention is to provide a machine of the type referred to above with a rail hold-down device which engages the side rails along the edges of each gain to prevent splitting of the rails as the step boards are driven into the gains.

A further object of this invention is to provide a machine as above set forth, having a plurality of hold-down plates which are actuated inwardly and outwardly together between rail engaging and rail releasing positions, the plates moving in a direction parallel to the step boards of the ladder.

The above and other objects and features of the invention will in part be apparent and will in part be obvious from the following detailed description, and the drawings, in which:

Figure 1 is a view in side elevation showing a machine constructed in accordance with an embodiment of this invention.

Fig. 2 is a plan view of the machine illustrated in Fig. 1, parts of two ladders being shown mounted thereon;

Fig. 3 is an enlarged view of the machine in transverse section taken on line III—III of Figs. 1 and 2, step boards being shown in the position assumed before being driven into gains of side rails;

Fig. 4 is a view in section taken along the same line as Fig. 3 but showing the step boards in place in the gains;

Fig. 5 is a view in section taken along a line V—V in Fig. 2, the step boards being shown partly raised into the gains, the side rails extending only a portion of the length of the machine;

Fig. 6 is an enlarged fragmentary view looking in the direction of the arrows VI—VI in Fig. 2;

Fig. 7 is an enlarged view in section showing details of one of the rail-positioning buttons of the machine in lowered position.

Fig. 8 is an enlarged view in section showing the button in raised position;

Fig. 9 is a view in section taken along a line IX—IX, in Fig. 8;

2

Fig. 10 is a view in side elevation showing a completed ladder; and

Fig. 11 is a fragmentary view in section taken along a line IX—IX in Fig. 1.

In the following detailed description, and the drawings, like reference characters indicate like parts.

The machine of this invention is used in the assembly of ladders of the type shown in Fig. 10. The ladder includes a main section 11 and a rear section 12, only part of which is shown. The main section includes side rails 13 and 14. Side rails 13 and 14 converge toward a top platform 15. Platform 15 is attached to the upper ends of the side rails. The side rails are connected together by tension rods 16, and are provided with gains 17, there being a gain in each side rail immediately above each of the tension rods. The gains are in the inner faces of the side rails and receive the ends of step boards 18. Step boards 18 hold the side rails in spaced relation and spread the rails sufficiently to put the tension rods under tension.

The machine of this invention is used for driving the step boards of a ladder into the gains of the side rails thereof and load the tension rods in tension.

As shown in Figs. 1 and 2, the machine includes a pair of elongated channel-shaped frame members 19 and 20. Frame members 19 and 20 are supported by legs 21. The side members converge toward the axis of the machine at the same angle as do the side rails of the ladder, as shown in Fig. 2. As shown in Figs. 2, 3 and 4, the side rails are supported inside of and parallel to the side frame members and closely spaced therefrom. The rails are supported, as shown in Fig. 5, with each gain 17 immediately above a slotted member 23. Numbers 23 are attached to the inside walls of the frame members and and guide the step boards into the gains. The step boards are raised into the gains by a movable frame 24.

Frame 24 carries transverse horizontal bars 26 (Figs. 3 and 4). Each cross bar 26 engages one of the step boards, and when the movable frame is raised, bars 26 engage the step boards and drive the step boards into the gains from the position shown in Fig. 3 to the position shown in Fig. 4.

As the step boards are driven upwardly into the gains, the side rails are held down by hold-down plates 27. Each hold-down plate 27 is mounted above and in alignment with one of the slotted members 23. Each plate 27 slides horizontally from a rail-engaging position shown in full lines in Fig. 3 to a rail-releasing position shown in dot-dash lines at 27a.

The inner edge of each plate 27 is bifurcated (Figs. 2 and 5) and the bifurcations engage one of the side rails on either side of one of the gains to prevent splitting of the wood of the gain as a step board is driven into place. As shown in Fig. 4, the upper edges of the step boards extend into the spaces between bifurcations of the hold-down plates when driven home into the gains. When the step boards have been driven home, the plates are drawn back in a direction perpendicular to the axis of the machine and lengthwise of the step boards.

The machine which has been described in general terms to this point will now be described in greater detail.

As shown in Figs. 2, and 3 to 5, each hold-down plate 27 is guided by a guide member 31. Guide member 31 is attached to the upper faces of the side frame members 19 and 20 and guide the motion of the plates in a direction perpendicular to the axis of the machine as the plates reciprocate.

Each plate is provided with an opening 32 at the outer edge thereof (see Figs. 3 and 4). Each opening 32 receives a ball actuator 33. Each ball actuator 33 forms the upper end of a crank 34. Cranks 34, in turn, are mounted on elongated shafts 35 and 36. Shafts 35 and 36 can be turned to swing the cranks between the position shown in full lines at 34 in Fig. 3 at which the plates can engage the side rails and the position shown in dot-dash lines at 34a at which the side rails are released.

Crank shaft 35 is mounted parallel to side frame member 19 (see Fig. 2). Frame member 19 carries bearings 37 (Fig. 1) in which shaft 35 turns. Shaft 36 is similarly mounted on and parallel to frame member 20. Shafts 35 and 36 are parallel to the side frame members and converge at the same angle as do the side frame members. However, the cranks actuate the plates in and out perpendicularly to the axis of the machine because, as shown in Figs. 3 and 4, the openings 32 in the plates are sufficiently larger than the heads of the cranks to permit the cranks to actuate the plates in this manner.

Shafts 35 and 36 are linked together by an assembly shown in Fig. 6. Each shaft carries a transverse bar 38 which is attached thereto. The bars 38 are connected by tie rods 39. The tie rods cause the shafts to turn in unison in such a manner that when one of the shafts is turned, the other shaft turns therewith but in the opposite direction. A handle 41 (Figs. 2 and 6) is attached to shaft 36 for turning the shafts 35 and 36.

The side rails of the ladder are supported by a plurality of hooks 42 (see Figs. 2 and 3). Hooks 42 are attached to the inner sides of frame members 19 and 20 and are spaced below the hold-down plates. The hooks are designed to hold the side rails, as shown in Fig. 3, in such a position that the rails slope upwardly and inwardly, whereby the step boards are free to enter the lower ends of the gains in the side rails. As the step boards are raised into the gains, the side rails are raised to upright position, as shown in Fig. 4.

As the step boards are driven into place in the gains of the side rails, the side rails are held in engagement with the hooks 42 by pins 43, as shown in Figs. 3 and 4. Each pin 43 has a head 44 for engaging one of the side rails. As shown in Figs. 7 and 8, each pin is adjustable between a position shown in Fig. 7 at which the head of pin 43 lies flatwise against the inner side of the side rail associated therewith, and a position shown in Fig. 8 in which the head is spaced inwardly therefrom. The pins are adjustable inwardly and outwardly to accommodate ladders having side rails of varying thickness.

In Fig. 2, the machine is shown with portions of two ladders mounted thereon. One of these ladders, shown mounted on the left hand end of the machine, as shown in Fig. 2, is provided with relatively narrow side rails 13 and 14, and pins 43, which engage side rails 13 and 14, are shown with the heads thereof spaced from the frame members. The other of the ladders, shown on the right hand end of the machine, is provided with side rails 13' and 14'. Side rails 13' and 14' are relatively wider, and pins 43' which engage side rails 13' and 14' are shown with the heads thereof flat against the frame members. The pins engage the side rails and hold them, as shown in Figs. 2, 3 and 4, in proper position as the step boards are driven into the gains thereof.

The step boards are guided by the slotted members 23 (see Fig. 5). Each member 23 includes a pair of tongues 46. Tongues 46 extend toward the axis of the machine, and the tongues of each pair act on the opposite sides of one of the step boards to guide the step board into gains of the side members. The tongues of each pair define an upwardly inclined slot 47 along which the step board is driven. As shown, slot 47 has a width approximately equal to the thickness of one of the step boards.

As shown in Figs. 3 and 4, the outer edges of each step board are guided by guide blocks 48 which center the step board in the machine. Each guide block 48 is mounted in one of the slots 47 on adjustment screws 49. Screws 49 can be turned to so adjust the position of the blocks that the blocks guide the step boards properly into the gains of the side rails.

The step boards are driven into the gains by movable frame 24. Frame 24 includes side members 51 and 52 (Figs. 3 and 4). Side members 51 and 52 carry the cross bars 26 which, as already stated, engage the step boards. As shown in Figs. 3 and 4, the central portion of the upper edge of each cross bar 26 is cut away, as indicated at 53, so that the ends of each step board are firmly engaged by one of the cross bars. Each cross bar slides in a slot 47 of a guide member 23 attached to frame member 20 and in a corresponding slot 47' in a guide member 23' attached to frame member 19. Movable frame 24 is raised to drive the step boards into place. Frame 24 is raised by means of rolls 54. Rolls 54 engage side members 51 and 52 and drive the movable frame upwardly to bring the cross bars to bear on the step boards. Rolls 54 are carried by bell cranks 56, as shown in Figs. 1 and 5. Cranks 56 are pivoted on horizontal frames 57 (see Figs. 1 and 2) and are driven by a pull rod 58. Pull rod 58 is drawn to the left as shown at Fig. 1, to swing the bell cranks clockwise and raise movable frame 24.

Pull rod 58 is actuated by a piston 61 mounted on the head thereof. Piston 61 reciprocates in a cylinder 62. Cylinder 62 is provided with fluid pressure lines 63 and 64 by means of which pressure fluid can be introduced into either end of the cylinder. Flow of pressure fluid through lines 63 and 64 is controlled by a foot-operated valve 65.

The pivots for ball cranks 56 are carried by frames 57, as already pointed out. Each frame 57 extends from a transverse frame strengthening channel 66 at the right hand end of the machine (see Fig. 1) to a short column 67 near the left hand end thereof. Each column 67 is mounted on one of a series of horizontal frame members 68 which strengthen the framework of the machine. Each frame 57 is connected to channel 66 and to one of the columns 67 by adjustable connections one of which is shown in detail (see Fig. 11). The ends of each frame 57 carry slotted tongues 71. Tongues 71 are connected to columns 21 and channel 66 by screws 72 so that the ends of each frame 57 can be adjusted up or down. As shown in Fig. 1, each frame 57 is supported by adjustment screws 73, 74 and 75. The adjustment screws are turned to raise or lower the ends and center portion of frame 57 to adjust the distance that the step boards are driven into the gains of the side rails when the machine is operated. Only the one of the pivot carrying frames 57 which is associated with the inside frame member 19 has been described and illustrated in detail, but it is to be understood that the other pivot carrying frame is similar thereto in construction.

When the machine is to be operated, step boards are set in place in guide slots 47 and 47' with each step board extending perpendicularly to the axis of the machine, and a pair of side rails complete with tension rods is mounted thereabove on hooks 42. If the ladder to be assembled is relatively narrow at its head end, the side rails are positioned as shown at 13 and 14 of Fig. 2, with the left hand ends thereof engaging head stops 72. If, on the other hand, the ladder is relatively wide at its head, an auxiliary head stop member 73 is swung from the position shown in Figs. 1 and 2 to the position shown in Fig. 5, to engage the ends of the side rails. When the side rails are in place on hooks 42, handle 41 is raised to advance the hold-down plates 27 to rail-engaging position overlying the side rails. Valve 65 is then depressed to cause pressure to enter the right hand of power cylinder 62 and draw the pull rod to the left, as shown in Fig. 1. The pull rod swings the bell cranks 56 clockwise to raise the movable frame and drive the step boards into the gains of the side rails from the position shown in Fig. 3 to that shown in Fig. 4. Then, foot valve 65 is released to permit fluid to enter the left hand end of the power cylinder to drive the pull rod to the right, thereby swinging the bell cranks counter-clockwise and releasing the movable frame so that the movable frame drops to the position shown in Fig. 3. Handle 41 then can be swung downwardly to withdraw the hold-down plates so that the ladder can be removed with the step boards in place in the gains of the side rails.

The bifurcations of the hold-down plates engage the side rails on either side of each gain. As shown, the spacing between bifurcations is approximately equal to the width of one of the step boards so that the bifurcations of each plate engage one of the side rails at the edges of one of the gains therein to prevent splitting of the side rails as the step boards are raised into the gains. When the hold-down plates are withdrawn, the plates move parallel to the step boards and in a direction perpendicular to the axis of the machine, so that the bifurcations are withdrawn along the sides of the step boards.

The machine which has been described above and illustrated in the accompanying drawings, is subject to structural modification without departing from either the spirit or the scope of the invention, as set forth in the appended claims.

Having thus described my invention, what I claim as new and desire to secure by Letters Patent is:

1. A side rail hold-down mechanism for a ladder-forming machine which comprises a flat plate having a bifurcated edge engageable with a side rail in alignment with a gain thereof; the spacing between bifurcations being substantially equal to the thickness of one of the step boards of the ladder, means for mounting the plate for reciprocation transversely of the side rail between a side rail engaging position in which the bifurcations overlie the side rail with the slot between the bifurcations aligned with one of the gains in the side rail and a released position in which the plate is disengaged from the side rail, said plate having an opening therethrough spaced from the bifurcations and extending transversely of the direction of movement thereof, a crank having a head extending into the opening in the plate, and means for swinging the crank to reciprocate the plate between side rail engaging and released positions.

2. A side rail hold-down mechanism for a ladder-forming machine which comprises a plurality of flat plates, each of said plates having a bifurcated edge engageable with a side rail in alignment with a gain thereof, the spacing between bifurcations being substantially equal to the thickness of one of the step boards of the ladder, means for mounting each of the plates for reciprocation transversely of the side rail between a side rail engaging position in which the bifurcations overlie the side rail, with the slot between the bifurcations aligned with one of the gains in the side rail and a released position in which the plate is disengaged from the side rail, each of said plates having an opening therethrough spaced from the bifurcations thereof and extending transversely of the direction of movement thereof, a crank having a head extending into the opening of each plate, and an elongated crank shaft attached to the cranks and swingable therewith to reciprocate the plates between side rail engaging and released positions.

HOWARD B. RICH.

References Cited in the file of this patent

UNITED STATES PATENTS

| Number | Name | Date |
|---|---|---|
| 977,738 | Herrick | Dec. 6, 1910 |
| 1,842,850 | Uline | Jan. 26, 1932 |
| 2,349,087 | Fraser | May 16, 1944 |